(12) United States Patent
Kazmierski et al.

(10) Patent No.: US 9,013,790 B1
(45) Date of Patent: Apr. 21, 2015

(54) HIGH CONTRAST REAR PROJECTION SCREEN FOR USE WITH A DIVERGING ILLUMINATION SOURCE

(71) Applicant: Google Inc., Mountain View, CA (US)

(72) Inventors: Andrei S. Kazmierski, Pleasanton, CA (US); Mary Lou Jepsen, Sausalito, CA (US); Belle Fu, Taipei (TW)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/303,190

(22) Filed: Jun. 12, 2014

(51) Int. Cl.
  *G03B 21/62* (2014.01)
  *G03B 21/625* (2014.01)

(52) U.S. Cl.
  CPC .................... *G03B 21/625* (2013.01)

(58) Field of Classification Search
  CPC ............... G03B 21/56; G03B 21/625
  USPC ............ 359/452–453, 456, 460, 443
  See application file for complete search history.

(56) References Cited

U.S. PATENT DOCUMENTS

| | | | |
|---|---|---|---|
| 5,563,738 A * | 10/1996 | Vance | 359/614 |
| 5,724,182 A * | 3/1998 | Mitani et al. | 359/457 |
| 6,449,089 B1 | 9/2002 | Moshrefzadeh et al. | |
| 6,466,368 B1 | 10/2002 | Piepel et al. | |
| 6,469,830 B1 | 10/2002 | Dubin et al. | |
| 6,535,333 B1 * | 3/2003 | Piepel et al. | 359/453 |
| 6,754,005 B2 | 6/2004 | Goto et al. | |
| 6,829,086 B1 * | 12/2004 | Gibilini | 359/453 |
| 7,233,439 B2 | 6/2007 | Shimizu | |
| 7,443,583 B2 | 10/2008 | Yamauchi | |
| 7,453,635 B2 | 11/2008 | Yeo et al. | |
| 8,233,217 B2 * | 7/2012 | Kindler et al. | 359/443 |
| 2001/0040263 A1 * | 11/2001 | Nakai | 257/432 |
| 2002/0109916 A1 | 8/2002 | Moshrefzadeh | |
| 2003/0184993 A1 | 10/2003 | Yamada | |
| 2006/0061861 A1 | 3/2006 | Munro et al. | |
| 2006/0209403 A1 * | 9/2006 | Parusel et al. | 359/453 |
| 2006/0268404 A1 | 11/2006 | Hyobu | |
| 2007/0115548 A1 * | 5/2007 | Ebina et al. | 359/460 |

OTHER PUBLICATIONS

Duparre, J. et al., "Novel Optics/Micro-Optics for Miniature Imaging Systems", Fraunhofer Institute for Applied Optics and Precision Engineering, SUSS MicroOptics SA (2006) 15 pages.

Wolfe, C.R. et al., "Characterization of BlackScreen™ for Rear-Projection Television", Proc. of SPIE vol. 5002 (2003) Downloaded From: http://spiedigitallibrary.org/ on Nov. 19, 2013, pp. 97-105.

Morris, G.M. et al., "Engineered diffusers™ for display and illumination systems: Design, fabrication, and applications", www.RPCphotonics.com, downloaded from Internet prior to Jun. 12, 2014, 11 pages.

(Continued)

*Primary Examiner* — Christ Mahoney

(74) *Attorney, Agent, or Firm* — Blakely Sokoloff Taylor & Zafman LLP

(57) ABSTRACT

A projection screen includes a transparent substrate having a front side and a backside, a dark film disposed across the front side of the transparent substrate, an array of holes disposed through the dark film, a diffusing layer disposed between the transparent substrate and the dark film, and an array of lenses disposed across the backside of the transparent substrate. The array of lenses are aligned to focus display light incident through the array of lenses towards the array of holes and the diffusing layer diffuses the display light for emission out the array of holes as diffuse display light.

24 Claims, 6 Drawing Sheets

(56) References Cited

OTHER PUBLICATIONS

Sales, Tasso R.M. et al., "Light Tamers Engineered microlens arrays provide new control for display and lighting applications", Photonics Spectra, Reprinted from the Jun. 2004 issue of Photonics Spectra, 4 pages.

Vikuiti™, "Vikuiti™ Rear Projection Film", Vikuiti Display Enhancement 3M, Data sheet Oct. 2006, 3M Optical Systems Division, 6 pages.

Vikuiti™, "Vikuiti™ Rear Projection Display Screen", Vikuiti Projection Display Components 3M, 3M Optical Systems Division, downloaded from Internet prior to Jun. 12, 2014, 8 pages.

Norton, A.E. et al., "High Contrast Rear Projection Screen", U.S. Appl. No. 14/303,163, filed Jun. 12, 2014, whole document.

U.S. Appl. No. 14/303,163, filed Jun. 12, 2014, U.S. Office Action mailed Oct. 3, 2014, 18 pages.

* cited by examiner

SINGLE-SIDED MICROLENS

DOUBLE-SIDED MICROLENS

DOUBLE-SIDED MICROLENS

HIGH CONTRAST REAR PROJECTION SCREEN FOR USE WITH A DIVERGING ILLUMINATION SOURCE

TECHNICAL FIELD

This disclosure relates generally to display technologies, and in particular, to rear projection screens.

BACKGROUND INFORMATION

Conventional rear projection screens use a thin diffusing layer in the form of a matte screen. An image is projected onto the back of the diffusing layer, where it is diffused and scattered into the viewing environment. The diffusing layer provides an image surface and its diffusive nature serves to increase the viewing angles from which the image can be observed. Often these simple diffusing layer projection screens have poor contrast in well-lit rooms. This poor contrast is due, at least in part, from the scattering of ambient light back into the viewing environment, thereby deleteriously affecting the black levels and contrast of the rear projection screen.

FIGS. 1A and 1B illustrate a conventional rear projection screen 50 that uses small glass spheres 62 embedded in a black adhesive 61 on a flat glass plate 60. From the top side, the majority of the screen surface is covered by black adhesive 61, thereby reducing the back reflections of ambient light and improving display screen contrast. Each glass sphere 62 forms a thin channel through black adhesive 61 and focuses incident light through a pinhole 66 that is self-aligned to a corresponding glass sphere 62. Glass spheres 62 gather the majority of the backside incident light and focus it through pinholes 66. FIG. 1B illustrates a scenario where on-axis light 64 that is perpendicular to rear projection screen 50 is focused by a glass sphere 62 through pinhole 66. However, off-axis light 65 (illustrated in FIG. 1A) must be bent using a Fresnel lens 63. Fresnel lens 63 operates to receive obliquely incident light and bend it such that the light is incident through glass spheres 62 at near normal angles to glass plate 60. The off-axis light 65 must be bent to a normal trajectory to maintain angular brightness uniformity across the front side of the screen. This design operates to maintain screen output efficiency while increasing the screen contrast in well-lit rooms. However, it requires that backside incident light be incident at a near normal angle to achieve acceptable angular brightness uniformity and uses a Fresnel lens 63 to do so.

FIGS. 1C and 1D illustrate another conventional rear projection screen 75. Rear projection screen 75 operates in a similar manner to rear projection screen 50. Rear projection screen 75 includes an array of lenslets 83 replicated across the back surface of a substrate 82 having a layer of dark material 81 patterned across the top surface. Dark material 81 is patterned using a high-powered laser directed at lenslets 83. Lenslets 83 focus the beam onto dark material 81 burning or ablating away pinholes that are self-aligned to lenslets 83. Similar to rear projection screen 50, incident light must be directed onto lenslets 83 along a direction that is substantially perpendicular or normal to the surface of substrate 82. Again, normal incidence is achieved using a Fresnel lens 84. This design also operates to maintain screen output efficiency while increasing the screen contrast in well-lit rooms. However, as before it requires that backside incident light be incident at near normal angles to achieve acceptable angular brightness uniformity and uses a Fresnel lens 84 to do so.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of an apparatus, system and method of fabrication for a high contrast rear projection screen for use with diverging illumination sources are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
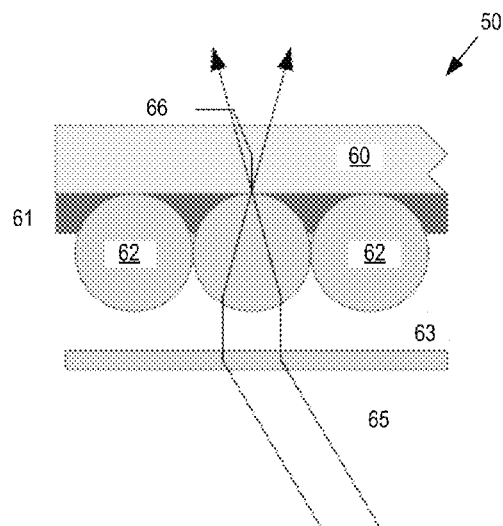
FIGS. 1A and 1B (PRIOR ART) illustrate a conventional rear projection screen using a Fresnel lens to achieve near normal incidence of light.
Figure 1B:
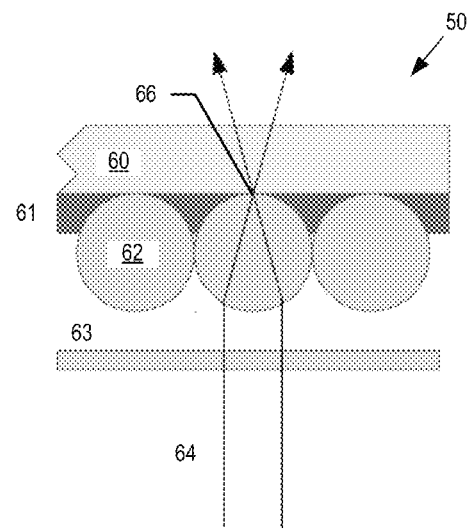
Figure 1C:
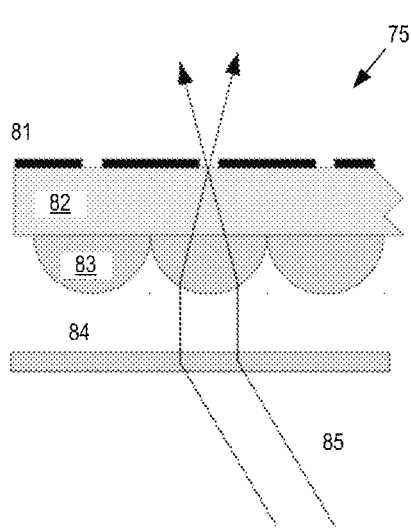
FIGS. 1C and 1D (PRIOR ART) illustrate another conventional rear projection screen using a Fresnel lens to achieve near normal incidence of light.
Figure 1D:
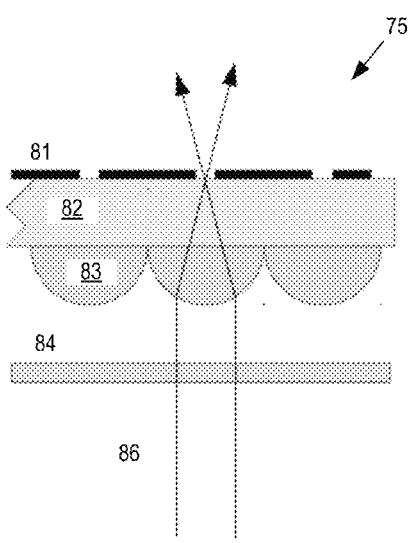
Figure 2:
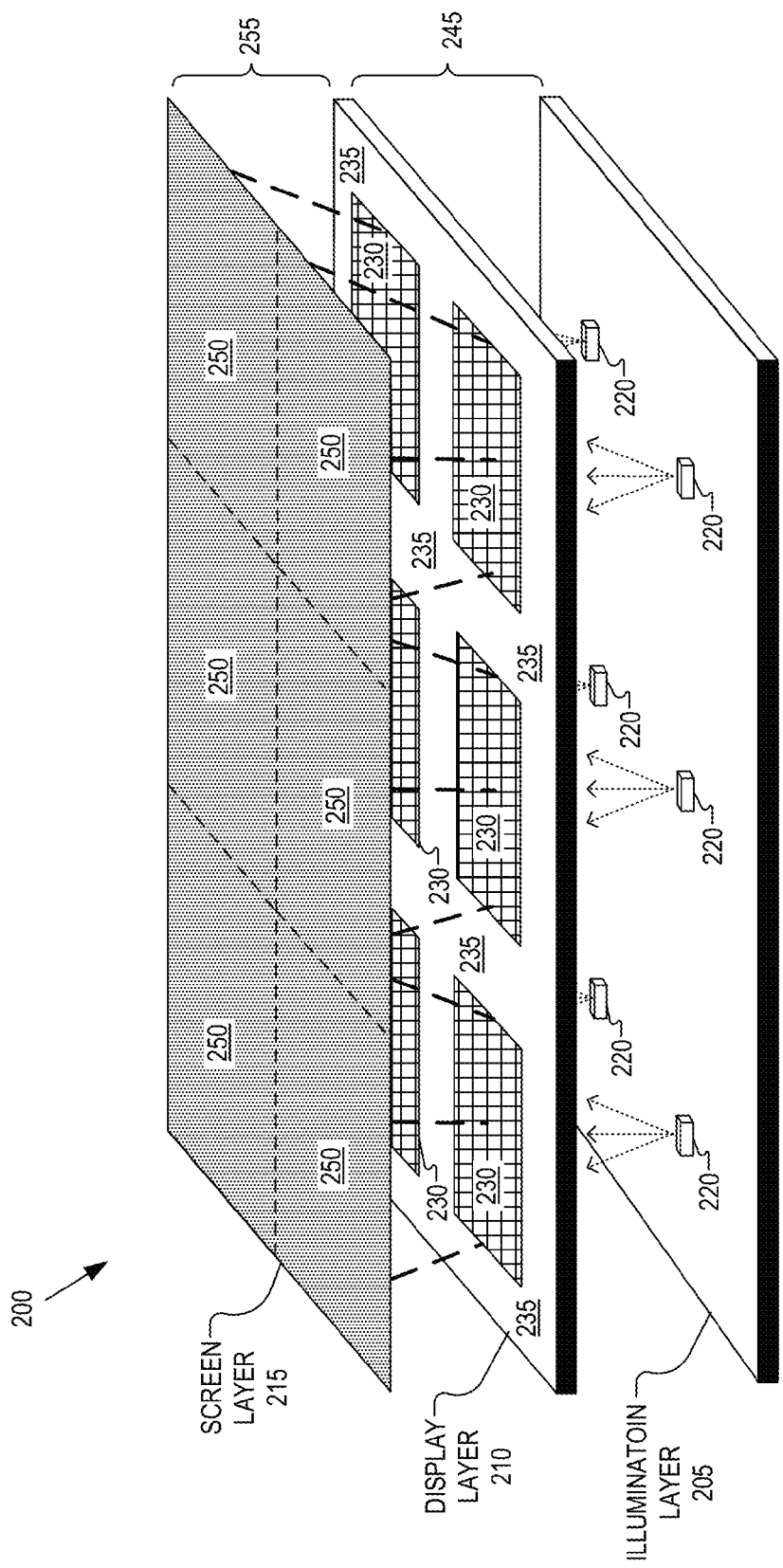
FIG. 2 is a perspective view illustrating functional layers of a rear projection display, in accordance with an embodiment of the disclosure.
Figure 3A:
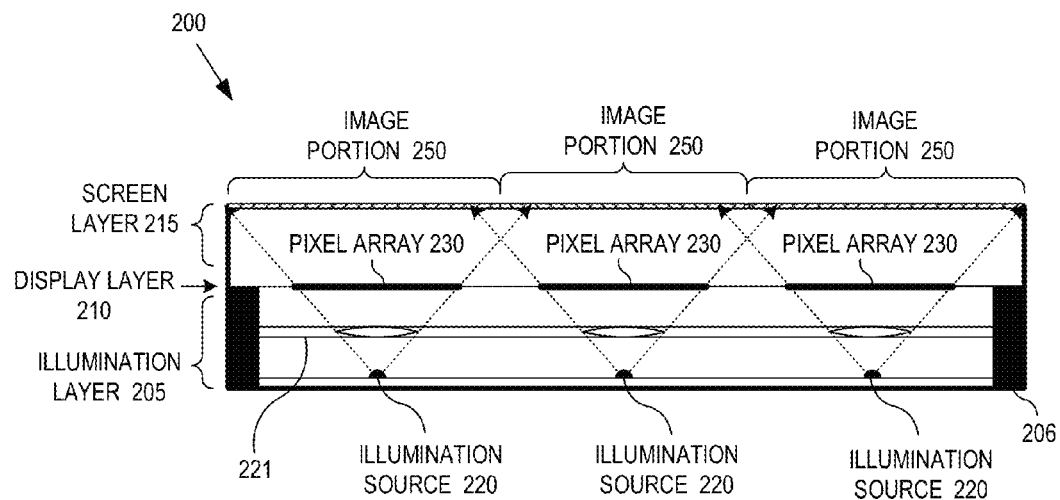
FIG. 3A is a cross-sectional view of functional layers of a rear projection display, in accordance with an embodiment of the disclosure.

FIGS. 2 and 3A illustrate functional layers of a rear projection display 200, in accordance with an embodiment of the disclosure. FIG. 2 is a perspective view of the layers of display 200 while FIG. 3A is a cross-section view of the same. The illustrated embodiment of display 200 includes an illumination layer 205, a display layer 210, and a screen layer 215. The illustrated embodiment of illumination layer 205 includes an array of illumination sources 220 and a lensing layer 221 (illustrated in FIG. 3A only for clarity). The illustrated embodiment of display layer 210 includes transmissive pixel arrays 230 separated from each other by spacing regions 235. The illustrated embodiment of screen layer 215 is divided into regions for displaying image portions 250 of an overall unified image. Rear projection display 200 is made up of a plurality of pixlets, each including an illumination source 220, transmissive pixel array 230, and a screen region for displaying an image portion 250 all aligned within a column through display 200.

In the illustrated embodiment, each illumination source 220 is aligned under a corresponding pixel array 230 to illuminate a backside of the corresponding pixel array with lamp light. Illumination sources 220 may be implemented as independent light sources (e.g., color or monochromatic LEDs, quantum dots, etc.) that emit light with a defined angular spread or cone to fully illuminate their corresponding transmissive pixel array 230 residing above on display layer 210. The illumination layer 205 and display layer 210 are separated from each other by a fixed distance 245 (e.g., 8 mm). This separation may be achieved using a transparent intermediary (e.g., glass or plastic layers) and may further include one or more lensing layers 221 (including lenses, apertures, beam confiners, etc.) to control or manipulate the angular extent and cross-sectional shape of the lamp light emitted from illumination sources 220. In one embodiment, an illumination controller may be coupled to illumination sources 220 to control their illumination intensity. Illumination layer 205 may include a substrate upon which illumination sources 220 are disposed.

Transmissive pixel arrays 230 are disposed on the display layer 210 and each includes an array of transmissive pixels (e.g., 100 pixels by 100 pixels). In one embodiment, the transmissive pixels may be implemented as backlit liquid crystal pixels. Each transmissive pixel array 230 is an independent display array that is separated from adjacent transmissive pixel arrays 230 by spacing regions 235 on display layer 210. The internal spacing regions 235 that separate adjacent pixel arrays 230 from each other may be twice the width as the perimeter spacing regions 235 that separate a given pixel array 230 from an outer edge of display layer 210. In one embodiment, the internal spacing regions 235 have a width of 4 mm while the perimeter spacing regions 235 have a width of 2 mm. Of course, other dimensions may be implemented.

As illustrated, transmissive pixel arrays 230 are spaced across display layer 210 in a matrix with spacing regions 235 separating each transmissive pixel array 230. In one embodiment, transmissive pixel arrays 230 each represent a separate and independent array of display pixels (e.g., backlit LCD pixels). Spacing region 235 are significantly larger than the inter-pixel separation between pixels of a given transmissive pixel array 230. Spacing regions 235 provide improved flexibility for routing signal lines or the inclusion of additional circuitry, such as a display controller. Spacing regions 235 that reside along the exterior perimeter of display layer 210 also provide space for the bezel trim 206 of display 200. Bezel trim 206 operates as the sides of the housing for display 200. The spacing regions 235 that reside along the exterior perimeter also provide space for power and/or communication ports.

Although FIG. 2 illustrates display layer 210 as including six transmissive pixel arrays 230 arranged into two rows and three columns, it should be appreciated that various implementations of display 200 may include more or less transmissive pixel arrays 230 organized into differing combinations of rows and columns. As such, in embodiments having a one-to-one ratio of illumination sources 220 to transmissive pixel arrays 230, the number and layout of illumination sources 220 on illumination layer 205 may also vary. While FIG. 2 does not illustrate intervening layers between the three illustrated layers for the sake of clarity, it should be appreciated that embodiments may include various intervening optical or structural sub-layers, such as lens arrays, transparent substrates to provide mechanical rigidity and optical offsets, protective layers, or otherwise. Further details of the sub-layers of various embodiments of screen layer 215 are discussed below.

Figure 3B:
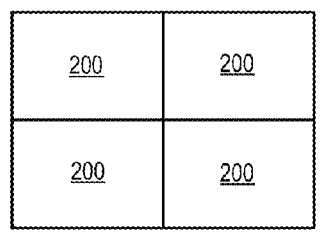
FIG. 3B illustrates how rear projection displays can be tiled to form larger seamless displays, in accordance with an embodiment of the disclosure.

Transmissive pixel arrays 230 are switched under control of a display controller to modulate the lamp light and project image portions 250 onto a backside of screen layer 215. In various embodiments, screen layer 215 includes matte material (or other diffusing material suitable for rear projection) that is disposed on a transparent substrate providing mechanical support. Image portions 250 collectively blend together on screen layer 215 to present a unified image to a viewer from the viewing side of screen layer 215 that is substantially without seams. In other words, the images created by transmissive pixel arrays 230 are magnified as they are projected across separation 255 (e.g., 2 mm) between display layer 210 and screen layer 215. The image portions 250 are magnified enough to extend over and cover spacing regions 235 forming a seamless unified image. The magnification factor is dependent upon separation 255 and the angular spread of the lamp light emitted by illumination sources 220. In one embodiment, image portions 250 are magnified by a factor of approximately 1.5. Not only does the unified image cover the internal spacing regions 235, but also covers the perimeter spacing regions 235. As such, display 200 may be positioned adjacent to other display tiles 200 and communicatively interlinked to form larger composite seamless displays, in which case the unified image generated by a single display tile becomes a sub-portion of a multi-tile unified image (e.g., see FIG. 3B).

Figure 3C:
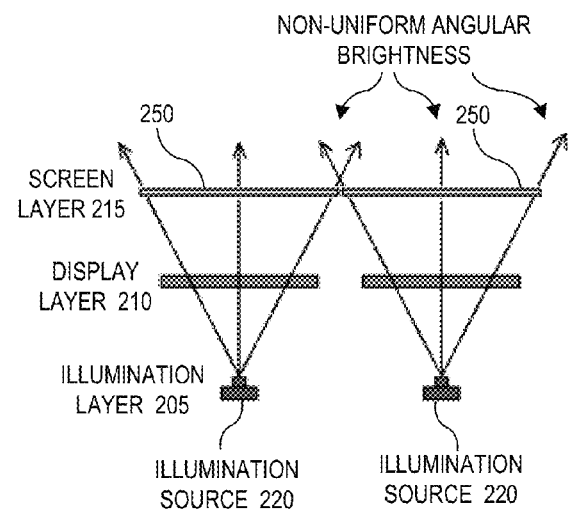
FIG. 3C illustrates angular brightness uniformity issues associated with rear projections displays illuminated by divergent light, in accordance with embodiments of the disclosure.

In a tiled rear-projection architecture, such as the one illustrated in FIGS. 2 and 3A, display light incident upon screen layer 215 is not collimated. This divergent light can result in angular brightness variations at different locations across screen layer 215. As illustrated in FIG. 3C, this deviation can be greatest around the perimeter of each image portion 250 defined by a given pixlet. Accordingly, FIGS. 4 and 7 present rear-projection screen architectures that accommodate non-collimated, obliquely incident display light while providing a relatively uniform angular brightness across the screen.

Figure 4:
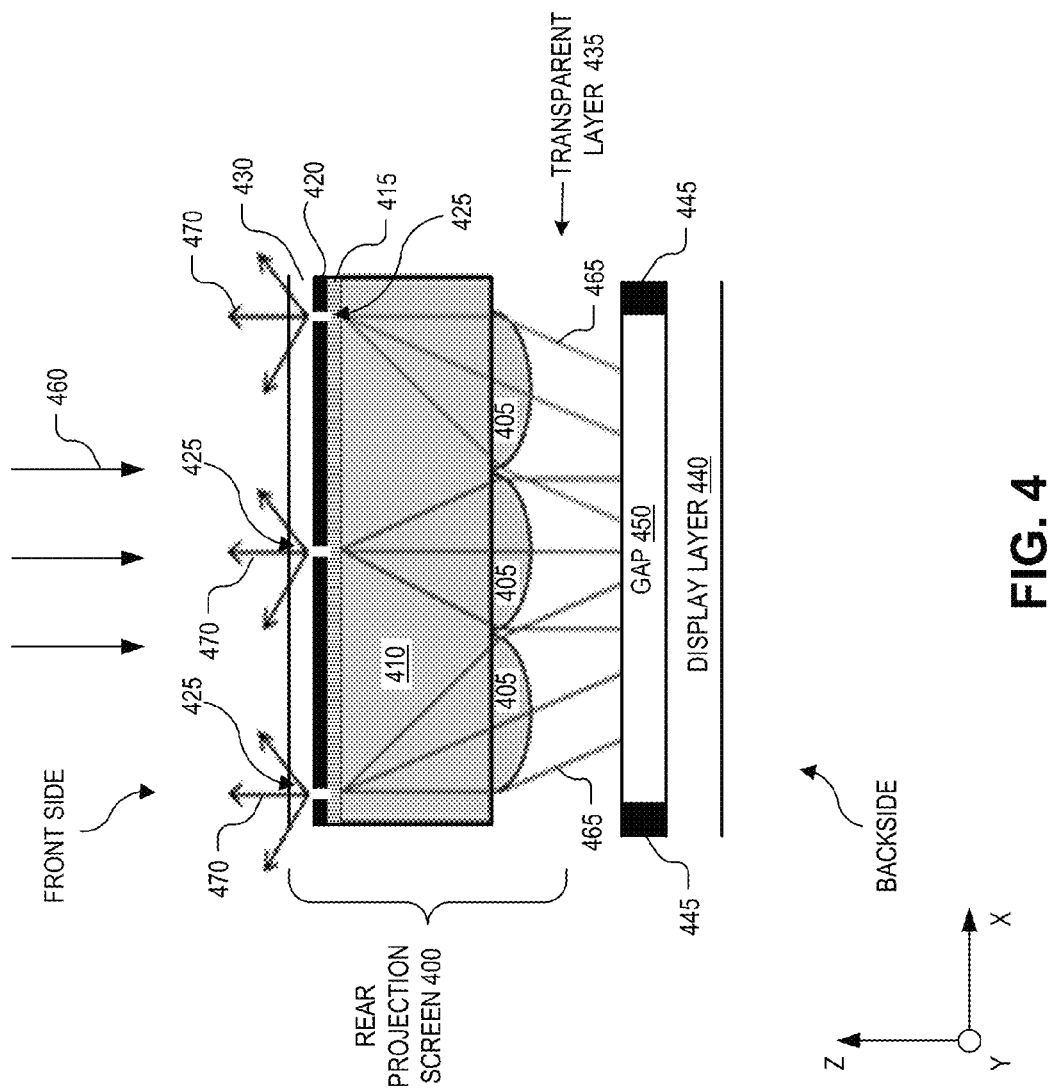
FIG. 4 is a cross-sectional view illustrating a portion of a rear projection screen, in accordance with an embodiment of the disclosure.

FIG. 4 is a cross-sectional view illustrating a portion of a rear projection screen 400, in accordance with an embodiment of the disclosure. Rear projection screen 400 is one implementation of screen layer 215 illustrated in FIGS. 2 and 3A; however, it should be appreciated that rear projection screen 400 is not limited for use with displays having the seamless tiling architecture illustrated in FIGS. 2 and 3A. Rather, rear projection screen 400 may be used with a variety of rear projection displays that use a divergent illumination source.

The illustrated embodiment of rear projection screen 400 includes an array of lenses 405, a transparent substrate 410, a diffusing layer 415, a dark film 420 having an array of holes 425, and a protective layer 430. In the illustrated embodiment, rear projection screen 400 may be positioned over a transparent layer 435 (e.g., glass, acrylic, polycarbonate, plastic or other transparent substrates) that is offset from a display layer 440 using spacers 445 to form gap 450. For example, display layer 445 may represent display layer 210 illustrated in FIGS. 2 and 3A. It should be appreciated that FIG. 4 only illustrates a small cross-section portion of rear projection screen 400, which is a repeating structure that extends in the X and Y plane of FIG. 4.

Dark film 420 covers a majority of the front side of transparent substrate 410. Dark film 420 is a low reflectance material coated over the front side of transparent substrate 410 to reduce the amount of back reflections of ambient light 460, thereby increasing the contrast of projection screen 400. However, so as not to block the majority of display light 465 projected from display layer 440, lenses 405 focus and direct (e.g., converge) the incident display light 465 through corresponding holes 425. Lenses 405 are disposed across the backside of transparent substrate 410 in a two-dimensional ("2D") array to direct or focus backside incident display light 465 through holes 425 in dark film 420. In one embodiment, there is a one-to-one correspondence between lenses 405 and holes 425.

Diffusing layer 420 is disposed between dark film 420 and transparent substrate 410, and in particular, passes under holes 420. Diffusing layer 420 operates to diffuse display light 465 for emission out holes 425 as diffuse display light 470. Diffuse display light 470 provides a uniform, wide viewing angle of the image from the front side of projection screen 400. Thus, diffusing layer 415 re-diverges display light 465, which was previously converged or focused by lenses 405 to improve image uniformity and viewing angle. In one embodiment, diffusing layer 415 operates as a Lambertian or near-Lambertian radiator of diffuse display light 470.

Unlike the projection screens illustrated in FIGS. 1A-1D, display light 470 need not be directed along an optical path through lenses 405 that is normally incident through transparent substrate 410 and normal to dark film 420. As such, a Fresnel lens is not necessary to redirect obliquely incident display light to a normal incidence. Rather, the oblique incidence of display light 465 through transparent substrate 410 and onto the backside of dark film 420 is retained. Instead, diffusing layer 415 operates to transform the highly directional and oblique display light 465 into diffuse display light 470 (e.g., Lambertian light) that can be perceived from a wide range of viewing angles with angular brightness uniformity. The elimination of a Fresnel lens reduces the fabrication complexity and cost of rear projection screen 400. Furthermore, the elimination of a Fresnel lens avoids the alignment issues between the Fresnel lens and each illumination source 220 that can arise in the tileable display architecture illustrated in FIGS. 2 and 3A.

Transparent layer 435 may be fabricated using glass, acrylic, polycarbonate, or other optical grade plastic and has a thickness that is selected to achieve a desired magnification factor for the divergent display light 465 projected from display layer 440. Similarly, transparent substrate 410 may also be fabricated of glass, acrylic, polycarbonate, or other optical grade plastic and has a thickness that corresponds to the approximate average focal length of lenses 405 such that the majority of display light 465 is directed through holes 425. In one embodiment, the optical power of lenses 405 may vary over the array to accommodate the variable length optical paths due to the divergence of display light 465. For example, in one embodiment, lenses 405 have increasing focal lengths (decreasing optical power) the closer they are to the perimeter of a given pixlet or the further off-center from their corresponding illumination source. This variable focal length may be achieved by gradually varying the curvatures and/or refractive index of lenses 405 over the array.

Diffusing layer 415 is fabricated of a material that emits optically diffuse light in a Lambertian or near Lambertian pattern. In one embodiment, diffusing layer 415 is a scattering layer that scatters display light 465 in a Lambertian pattern. The scattering layer may be fabricated using light scattering particles suspended within an optically transmissive material. For example, the scattering particles could be made of polytetrafluroethylene ("PTFE") particles, Barium sulfate, or other scattering materials. In another embodiment, the scattering layer could be a layer of ground glass. In the illustrated embodiment, diffusing layer 415 is disposed just beneath dark film 420 to scatter display light 465 through holes 420. Dark film 420 may be fabricated of a low reflectance, matte black material that is patterned to form holes 425. For example, dark film 420 may be similar to materials used in masking pixels in liquid crystal displays.

Figure 5:
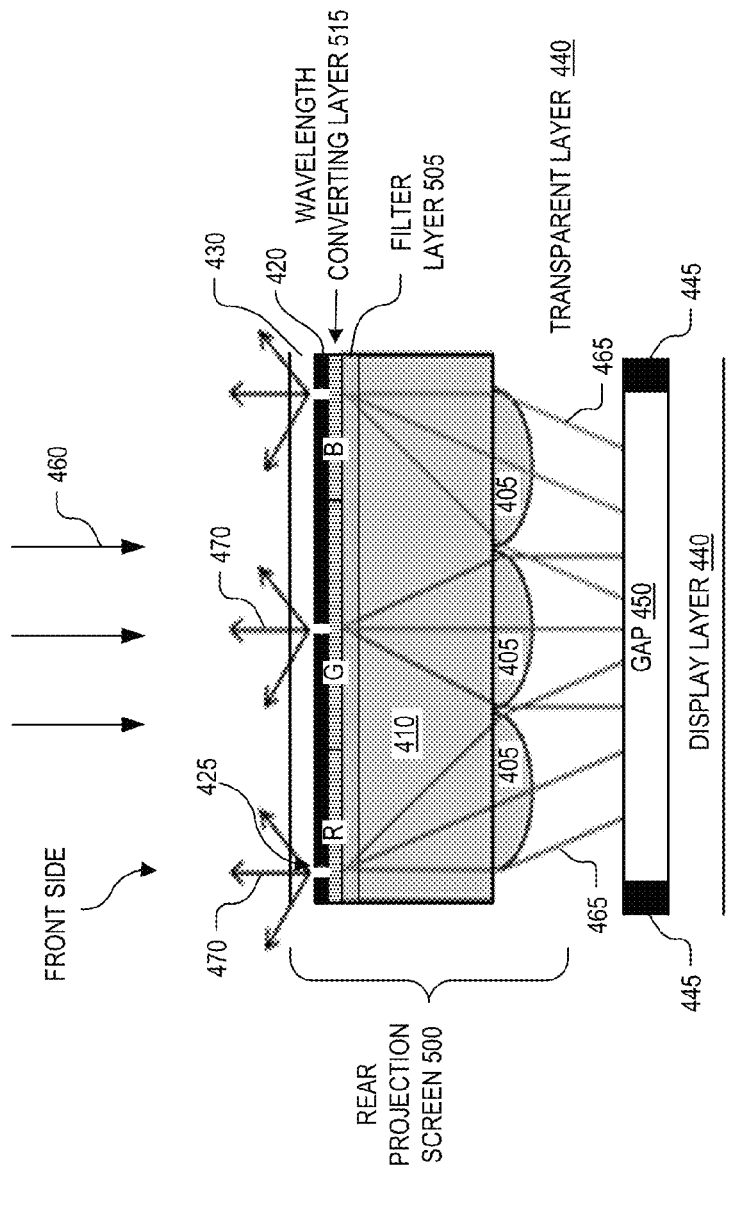
FIG. 5 is a cross-sectional view illustrating a portion of a rear projection screen using a wavelength converting layer, in accordance with an embodiment of the disclosure.

In another embodiment, the diffusing layer may be fabricated of a wavelength converting layer that absorbs display light 465 and re-emits it at a different wavelength in a diffuse, near Lambertian pattern. FIG. 5 is a cross-sectional view illustrating a portion of a rear projection screen 500 using a wavelength converting layer, in accordance with an embodiment of the disclosure. Rear projection screen 500 is similar to rear projection screen 400, but uses a wavelength converting layer 515 to implement diffusing layer 415 in FIG. 4. The illustrated embodiment of rear projection screen 500 includes array of lenses 405, transparent substrate 410, a filter layer 505, wavelength converting layer 515, dark film 420 having array of holes 425, and protective layer 430. It should be appreciated that FIG. 5 only illustrates a small cross-section portion of rear projection screen 500, which is a repeating structure that extends in the X and Y plane of FIG. 5.

Wavelength converting layer 515 may be fabricated using a variety of different materials that absorb display light 465 at one wavelength and re-radiate diffuse display light 470 at one or more different wavelengths. For example, wavelength converting layer 515 may be implemented using phosophor or quantum dot matrixes. In the illustrated embodiment, wavelength converting layer 515 is patterned into a tri-color array including color regions labelled R (red), G (green), and B (blue) to provide a full color display. In other embodiments, other color schemes (e.g., cyan, magenta, yellow or otherwise) may be implemented. In the case of a quantum dot array, each color section may include quantum dots having quantum energy states that radiate in an associated color spectrum (e.g., R, G, B or C, M, Y, or otherwise). In this manner, each hole 425 corresponds to a different color pixel with a group of three holes 425 corresponding to a full color macro-pixel group.

The re-radiative nature of wavelength converting layer 515 results in diffuse display light 470 being radiated in all directions. Accordingly, in one embodiment, filter layer 505 is included to block backscattering of diffuse display light 470. Filter layer 505 passes display light 465 which operates as a pump wavelength (e.g., ultraviolet pump light) that activates the re-radiative particles within wavelength converting layer 515, but blocks diffuse display light 470 output by wavelength converting layer 515. By blocking backscattered diffuse display light 470, cross-talk between adjacent display pixels is reduced, thereby improving image contrast.

In one embodiment, the array of lenses 405 and the array of holes 425 are regular arrays each with a constant separation pitch. In one embodiment, the separation pitch between adjacent holes 425 is greater than the separation pitch between adjacent lenses 405. The greater separation pitch of holes 425 accommodates divergent oblique angles for display light 465. In this embodiment, the center hole 425 that is directly positioned over an illumination source or backlight for display layer 440 is vertically aligned with its corresponding lens 405, since the display light ray for this pixel is normally incident. However, the larger separation pitch of holes 425 results in a linearly increasing offset between holes 425 and their corresponding lens 405 with distance from the centrally aligned hole 425. This increasing offset accommodates non-collimated backlighting from a near point source, as used in the tileable architecture illustrated in FIGS. 2 and 3A. In rear-projection embodiments that use collimated backlighting, the separation pitch of holes 425 and lenses 405 may be equivalent.

Figure 6A:
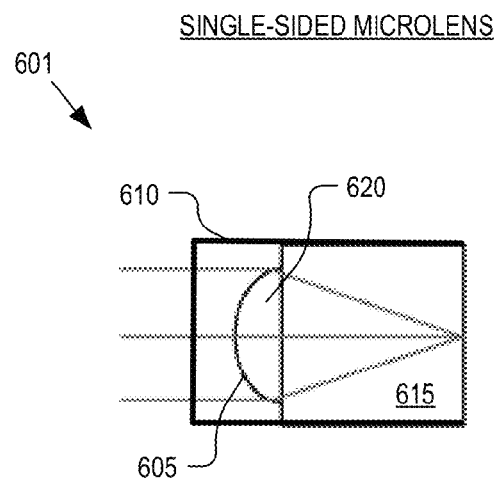
FIG. 6A-C illustrate various lens architectures, in accordance with embodiments of the disclosure.
Figure 6B:
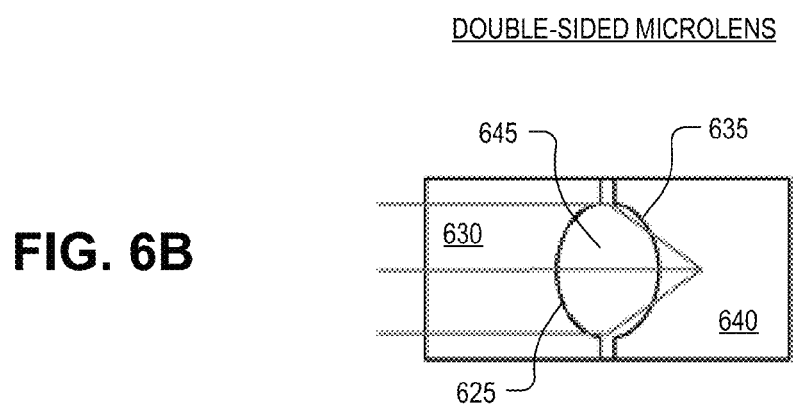
Figure 6C:
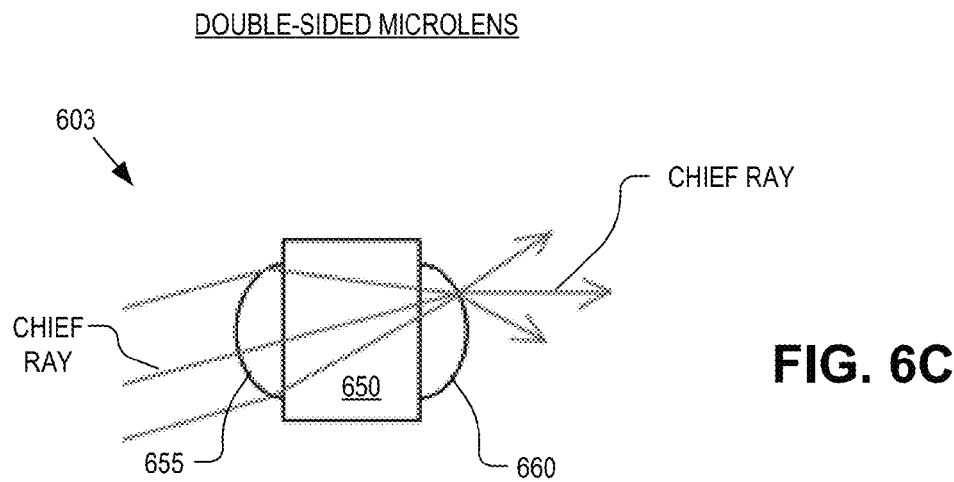

FIG. 6A-C illustrate various lens architectures for implementing lenses 405, in accordance with an embodiments of the disclosure. FIG. 6A illustrates a cross-sectional view of a single-sided microlens 601. The illustrated embodiment of single-sided microlens 601 includes a concave surface 605 formed into a transparent sheet 610, another transparent sheet 615, and optical adhesive 620 disposed within the void defined by concave surface 605 and transparent sheet 615. Optical adhesive 620 has a different refractive index than transparent sheet 610 and additionally servers to bond transparent sheet 610 to transparent sheet 615 forming a sealed microlens sandwich structure. For example, optical adhesive 620 may include Norland Optical adhesive with n=1.64, Loctite 5192, or otherwise. It should be appreciated that FIG. 6A illustrates the cross-section of only one single-sided microlens 601; however, in practice transparent sheet 610 would include a two-dimensional array of concave surfaces 605. Transparent sheets 610 and 615 may be fabricated of glass, acrylic, polycarbonate, or other optical grade plastics. In one embodiment, an array of single-sided microlenses 601 is fabricated by pressing or molding a negative imprint of an array of concave surfaces 605 into a transparent sheet 610.

FIG. 6B illustrates a cross-sectional view of a double-sided microlens 602. The illustrated embodiment of double-sided microlens 602 includes a concave surface 625 formed into a transparent sheet 630, another concave surface 635 formed into a transparent sheet 640, and optical adhesive 645 disposed within the void defined by concave surfaces 625 and 635. Optical adhesive 645 has a different refractive index than transparent sheets 630 and 640 and additionally servers to bond transparent sheet 630 to transparent sheet 640 forming a sealed microlens sandwich structure. For example, optical adhesive 645 may include Norland Optical adhesive with n=1.64, Loctite 5192, or otherwise. It should be appreciated that FIG. 6B illustrates the cross-section of only one double-sided microlens 602; however, in practice transparent sheets 630 and 640 would include a two-dimensional array of concave surfaces 625 and 635, respectively. Transparent sheets 630 and 640 may be fabricated of glass, acrylic, polycarbonate, or other optical grade plastics. In one embodiment, an array of double-sided microlenses 602 is fabricated by pressing or molding a negative imprint of an array of concave surfaces 625 and 635 into a transparent sheets 630 and 640.

The double-sided lens structure of double-sided microlens 602 can be designed to increase the optical power of the lens structure to facilitate a thinner transparent substrate 410 and a more compact projection screen. Additionally, the double-side lens structure can be designed such that the focal point of concave surface 625 falls on concave surface 635, which causes the chief ray to be redirected parallel with the optical axis and normal to the surface of the projection screen. This design may help improve angular brightness uniformity.

FIG. 6C illustrates a cross-sectional view of a double-sided microlens 603. The illustrated embodiment of double-sided microlens 603 includes a transparent layer 650 having a first microlens 655 disposed on a first side and a second microlens 660 disposed on a second side opposite the first microlens 655. Transparent layer 650 may be fabricated of glass, acrylic, polycarbonate, or other optical grade plastics. Microlenses 655 and 660 are aligned in an opposing orientation to each other. Microlenses 655 and 660 may be molded into the surfaces of transparent layer 650 or deposited thereon using patterning and reflow techniques or otherwise. Microlenses 655 and 660 may have the same or different refractive indexes, which may also be the same or different than transparent substrate 650. It should be appreciated that FIG. 6C illustrates the cross-section of only one double-sided microlens 603 however, in practice two-dimensional arrays of microlenses 655 and 660 extend along the sides of transparent substrate 650.

The double-sided lens structure of double-sided microlens 603 can be designed to increase the optical power of the lens structure to facilitate a thinner transparent substrate 410 and a more compact projection screen. Additionally, the double-side lens structure can be designed such that the focal point of microlens 655 substantially coincides with microlens 660, which causes the chief ray to be redirected parallel with the optical axis and normal to the surface of the projection screen. This design may help improve angular brightness uniformity.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A projection screen, comprising:
   a transparent substrate having a front side and a backside;
   a dark film disposed across the front side of the transparent substrate;
   an array of holes disposed through the dark film;
   a diffusing layer disposed between the transparent substrate and the dark film; and
   an array of lenses disposed across the backside of the transparent substrate, wherein the array of lenses is aligned to focus display light incident through the array of lenses towards the array of holes and the diffusing layer diffuses the display light for emission out the array of holes as diffuse display light,
   wherein lenses in the array of lenses are each separated by a first separation pitch and holes in the array of holes are each separated by a second separation pitch, wherein the second separation pitch of the array of holes is larger than the first separation pitch of the array of lenses to accommodate the display light incident on the array of lenses that is divergent.

2. The projection screen of claim 1, wherein the diffusing layer comprises a light scattering layer.

3. The projection screen of claim 2, wherein the light scattering layer comprises scattering particles suspended within a material layer.

4. The projection screen of claim 3, wherein the scattering particles comprise polytetrafluroethylene ("PTFE") particles or Barium sulfate.

5. The projection screen of claim 2, wherein the light scattering layer comprises ground glass.

6. The projection screen of claim 1, wherein the diffusing layer comprises a wavelength converting layer that absorbs the display light having a first wavelength and outputs the diffuse display light having one or more other wavelengths different from the first wavelength.

7. The projection screen of claim 6, wherein the wavelength converting layer comprises one of quantum dots or phosphor.

8. The projection screen of claim 7, wherein the wavelength converting layer is patterned into a tri-color array such that each of the holes of the array of holes outputs the diffuse display light associated with one of three different colors.

9. The projection screen of claim 6, further comprising:
a filter layer disposed between the array of lenses and the wavelength converting layer, the filter layer configured to pass the display light having the first wavelength but blocks the diffuse display light having the one or more other wavelengths to reduce backscattered light from the wavelength converting layer.

10. The projection screen of claim 1, wherein the array of lenses correspond to the array of holes on a one-to-one basis.

11. The projection screen of claim 1, wherein focal lengths of the array of lenses increases towards a periphery of the projection screen.

12. The projection screen of claim 1, wherein the array of lenses comprises an array of single-sided microlenses including:
an array of concave surfaces formed into a first transparent sheet;
a second transparent sheet bonded to the first transparent sheet to cover the array of concave surfaces; and
an optical adhesive having a refractive index different than that of the first transparent sheet disposed in voids defined by the array of concave surfaces and the second transparent sheet.

13. The projection screen of claim 1, wherein in the array of lenses comprises an array of double-sided microlenses including:
a first array of concave surfaces formed into a first transparent sheet;
a second array of concave surfaces formed into a second transparent sheet;
an optical adhesive having a refractive index different than that of the first and second transparent sheets disposed in voids defined by sandwiching the first transparent sheet to the second transparent sheet with the first and second arrays of concave surfaces aligned to each other.

14. The projection screen of claim 1, wherein the array of lenses comprises an array of double-sided microlenses including:
a transparent layer having a first side and a second side;
a first array of microlenses disposed across the first side of the transparent layer;
a second array of microlenses disposed across the second side of the transparent layer, wherein focal points of the first array of microlenses substantially coincide with surfaces of the second array of microlenses such that chief rays through the first array of microlenses are directed along a path substantially normal to the front side and backside of the transparent substrate.

15. A rear projection display, comprising:
a projection screen including:
a transparent substrate having a front side and a backside;
a dark film disposed across the front side of the transparent substrate;
an array of holes disposed through the dark film;
a diffusing layer disposed between the transparent substrate and the dark film; and
an array of lenses disposed across the backside of the transparent substrate, wherein the array of lenses is aligned to focus display light incident through the array of lenses towards the array of holes and the diffusing layer diffuses the display light for emission out the array of holes as diffuse display light, wherein lenses of the array of lenses are each separated by a first separation pitch and holes of the array of holes are each separated by a second separation pitch, wherein the second separation pitch of the array of holes is larger than the first separation pitch of the array of lenses to accommodate the display light incident on the array of lenses that is divergent;
a display layer including a transmissive pixel array to project the display light onto the projection screen from a backside of the projection screen; and
an illumination layer including an illumination source to illuminate a backside of the transmissive pixel array with divergent light.

16. The rear projection display of claim 15, wherein the diffusing layer comprises a light scattering layer.

17. The rear projection display of claim 16, wherein the light scattering layer comprises scattering particles suspended within a material layer.

18. The rear projection display of claim 16, wherein the diffusing layer comprises a wavelength converting layer that absorbs the display light having a first wavelength and outputs the diffuse display light having one or more other wavelengths different from the first wavelength.

19. The rear projection display of claim 18, wherein the wavelength converting layer comprises one of quantum dots or phosphor.

20. The rear projection display of claim 18, further comprising:
a filter layer disposed between the array of lenses and the wavelength converting layer, the filter layer configured to pass the display light having the first wavelength but blocks the diffuse display light having the one or more other wavelengths to reduce backscattered light from the wavelength converting layer.

21. The rear projection display of claim 15, wherein the array of lenses comprises an array of single-sided microlenses including:
an array of concave surfaces formed into a first transparent sheet;
a second transparent sheet bonded to the first transparent sheet to cover the array of concave surfaces; and
an optical adhesive having a refractive index different than that of the first transparent sheet disposed in voids defined by the array of concave surfaces and the second transparent sheet.

22. The rear projection display of claim 15, wherein in the array of lenses comprises an array of double-sided microlenses including:
a first array of concave surfaces formed into a first transparent sheet;
a second array of concave surfaces formed into a second transparent sheet;
an optical adhesive having a refractive index different than that of the first and second transparent sheets disposed in voids defined by sandwiching the first transparent sheet to the second transparent sheet with the first and second arrays of concave surfaces aligned to each other.

23. A projection screen, comprising:
a transparent substrate having a front side and a backside;
a dark film disposed across the front side of the transparent substrate;

an array of holes disposed through the dark film;

a diffusing layer disposed between the transparent substrate and the dark film; and an array of lenses disposed across the backside of the transparent substrate, wherein the array of lenses is aligned to focus display light incident through the array of lenses towards the array of holes and the diffusing layer diffuses the display light for emission out the array of holes as diffuse display light, wherein the array of lenses includes:

a first array of concave surfaces formed into a first transparent sheet;

a second transparent sheet bonded to the first transparent sheet to cover the array of concave surfaces; and an optical adhesive having a refractive index different than that of the first transparent sheet disposed in voids defined by the first array of concave surfaces and the second transparent sheet.

24. The projection screen of claim 23, wherein the array of lenses comprises an array of double-sided microlenses, wherein a second array of concave surfaces is formed into the second transparent sheet, and wherein the optical adhesive has a refractive index different than that of the first and second transparent sheets and is disposed in voids defined by sandwiching the first transparent sheet to the second transparent sheet with the first and second arrays of concave surfaces aligned to each other.

\* \* \* \* \*